United States Patent [19]

Bowman

[11] Patent Number: 4,709,956
[45] Date of Patent: Dec. 1, 1987

[54] HANDY-CAP PICK-UP COVER

[76] Inventor: Lawrence S. Bowman, P.O. Box 779, Valley View, Pa. 17983

[21] Appl. No.: 900,290

[22] Filed: Aug. 25, 1986

[51] Int. Cl.$^4$ .............................................. B60P 3/42
[52] U.S. Cl. .................................... 296/100; 296/163; 296/10
[58] Field of Search .......................... 296/100, 10, 163

[56] References Cited

U.S. PATENT DOCUMENTS

| 3,231,305 | 1/1966 | Beckman | 296/100 |
| 3,453,020 | 7/1969 | Santillo, Jr. | 296/100 |
| 3,688,787 | 9/1972 | Feather | 296/100 |
| 3,901,548 | 8/1975 | Seaman, Jr. | 296/100 |
| 4,272,119 | 6/1981 | Adams | 296/100 |
| 4,285,539 | 8/1981 | Cole | 296/100 |

FOREIGN PATENT DOCUMENTS

| 2105660 | 3/1983 | United Kingdom | 296/163 |
| 2145681 | 4/1985 | United Kingdom | 296/100 |
| 1079476 | 12/1982 | U.S.S.R. | 296/100 |

Primary Examiner—Robert B. Reeves
Assistant Examiner—Carol L. Olson
Attorney, Agent, or Firm—Richard C. Litman

[57] ABSTRACT

A removable cover for a pick-up truck bed, including a plurality of inverted "U"-shaped frames standing upright and a windowed vinyl canopy rested thereupon.

7 Claims, 6 Drawing Figures

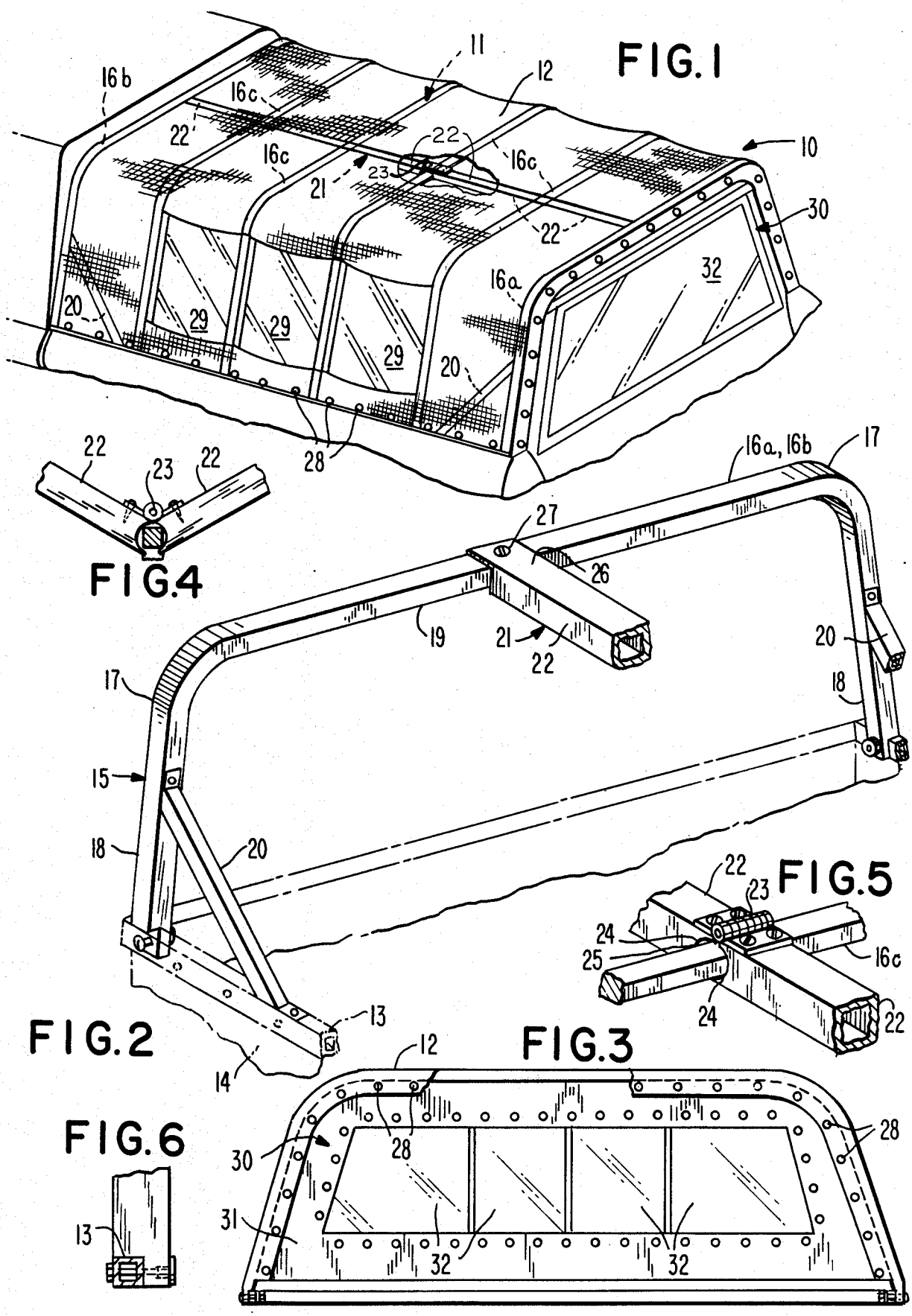

HANDY-CAP PICK-UP COVER

BACKGROUND OF THE INVENTION

1. Field of the Invention

This invention relates generally to pick-up truck accessories. More specifically it relates to collapsible canopy roofs for pick-up trucks.

2. Description of Prior Art

In the past, numerous collapsible canopy roofs have been developed for installation upon pick-up trucks, each being designed with certain specific advantages over other designs of such roofs, some being tall, others being low as well as other distinctive features. However, all of them have the same disadvantages of requiring at least two or three persons for being erected on the vehicle or else being dismantled therefrom, as well as taking considerable time to do. This is of course objectionable, as sometimes it is a problem to gather up two or three extra persons nearby, such as at a camping ground, so as to help erect or dismantle it.

SUMMARY OF THE INVENTION

Accordingly, it is a principal object of the present invention, to provide a handy-cap pick-up cover which can be set up quickly and easily by one person doing it all alone.

Another object is to provide a handy-cap pick-up cover which takes up less space than other covers when folded up so that it can be more conveniently carried along on a trip in a collapsed position and then erected at a destination, if preferred.

Other objects are to provide a handy-cap pick-up cover which is simple in design, inexpensive to manufacture, rugged in construction and efficient in operation.

These and other objects will be readily evident upon a study of the following Specification and the accompanying Drawing.

BRIEF DESCRIPTION OF THE DRAWINGS

FIG. 1 is a perspective view of a pick-up cover, shown in accordance with the present invention and with the hinges on the longitudinal locking bar omitted for purposes of clarity;

FIG. 2 is a fragmentary perspective view of a typical frame member of the embodiment of the invention;

FIG. 3 is a front elevational view of the sliding window end of the invention;

FIG. 4 is a fragmentary side elevational view of the center rib locking bar in the open position;

FIG. 5 is a fragmentary enlarged perspective view of one of the hinge means on the center rib locking bar in the locked position, and FIG. 6 is a fragmentary end elevational view of a typical corner bolt and tee nut installed in all four corners.

DETAILED DESCRIPTION

Referring now to the Drawing in greater detail, the reference numeral 10 represents a handy-cap according to the present invention, wherein there is a framework 11 and a canopy 12 for being installed upon the framework.

The framework comprises a base rail 13 which is permanently installed upon the top edge of a pick-up truck bed body side walls 14, and a removable frame assembly 15 that is mounted upon the base rail. The frame assembly is comprised of a plurality of inverted, "U"-shaped frame members 16a, 16b and 16c placed parallel, spaced apart and extending transversely across the pick-up truck bed. Ends of solid frames 16c are generally secured to respectively adjacent rails 13 by any well-known means or methods. Each frame member is made having two bends 17 so as to form two downwardly directed legs 18 and a horizontal top beam 19 therebetween that serves as a roof over the truck bed. The two end most frame members 16a and 16b are made of tubular square aluminum so to serve as rear end and front end frame members respectively while the intermediate frame members 16c are all made of solid aluminum rods located therebetween. Corner braces 20 extend angularly between the rail 13 and each one of the legs of the end frame members 16a and 16b so as to hold these frame members upright. The plurality of intermediate frame members 16c are held upright by a single longitudinally disposed locking bar 21 extending across a top of all the frame members, so as to transfer rigidity of the end frame members to the frame members 16c therebetween. The locking bar is comprised of several sections 22 made of tubular square aluminum; the sections being each attached together at their ends adjacent the intermediate frame members 16c by a hinge 23 therebetween. A semi-circular notch 24 is made on the end face of each section so as to form a circular opening 25 when the bar is in straight position and thus locks around the frame member 16c as shown in FIGS. 4 and 5. Each end most portion of the locking bar is made to have a flat tongue 26 on a terminal end of the locking bar, instead of the above described notch 24; the tongue being readily securable by a screw 27 to each of the frame members 16a and 16b, as shown in FIG. 2. All screws used on the frame assembly may be equipped with wings for quick assembly or disassembly.

The canopy 12 is made from heavy reinforced vinyl fabric attached to the framework by heavy duty, stainless steel snap fittings 28. Heavy clear vinyl windows 29 may be sewn on the canopy for visibility. The canopy extends across the top and down opposite sides to weatherproof the interior of the truck bed. Opposite end walls 30 formed on end frame members 16a and 16b comprise aluminum sheeting 31 riveted to the frames and fitted with windows 32 of vinyl, as described above.

While various changes may be made in the detail construction, it is understood that such changes will be within the spirit and scope of the present invention as is defined by the appended claims.

What I now claim is:

1. A cover assembly for the bed of a pick-up truck having side walls provided with top edges comprising, in combination;

a framework including a removable frame assembly and a pair of base rails permanently mounted on said side wall top edges, said frame assembly including a pair of opposite end most and a plurality of intermediate inverted U-shaped frame members disposed in an upright spaced apart relationship atop said base rails, angular braces joined between said end most frame members and said rails, a locking bar comprising a plurality of adjacent tubular sections of rectangular stock each having respective end faces, hinge means joining at least certain of said locking bar section end faces in an opposed manner, opposed ones of said end faces each provided with a semi-circular notch whereby, adjacent ones of said semi-circular notches provide a circular opening surrounding respective ones of said intermediate frame members when said locking bar is in a longitudinal disposition to secure said frame members in a fixed relationship atop said base rails.

2. The combination of claim 1 wherein, said locking bar includes opposite end portions each having a flat tongue respectively engageable with said end most frame members.

3. The combination of claim 2 including, fastening means securing said locking bar tongues to said end most frame members.

4. The combination of claim 1 including, metal sheeting spanning a portion of one of said end most frame members, and a clear VINYL window provided adjacent said metal sheeting.

5. The combination of claim 1 wherein a VINYL® canopy is removably mounted on the framework.

6. The combination of claim 5 wherein heavy clear VINYL® panel windows are disposed in the canopy to provide visibility therethrough.

7. The combination of claim 1 wherein there is only a single locking bar extending across a top of the frame assembly.

* * * * *